United States Patent
Dommaschk et al.

(10) Patent No.: US 10,248,148 B2
(45) Date of Patent: Apr. 2, 2019

(54) CONVERTER FOR SYMMETRICAL REACTIVE POWER COMPENSATION, AND A METHOD FOR CONTROLLING SAME

(71) Applicant: SIEMENS AKTIENGESELLSCHAFT, Munich (DE)

(72) Inventors: Mike Dommaschk, Moehrendorf (DE); Martin Pieschel, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 46 days.

(21) Appl. No.: 15/310,474

(22) PCT Filed: May 22, 2014

(86) PCT No.: PCT/EP2014/060566
§ 371 (c)(1),
(2) Date: Nov. 11, 2016

(87) PCT Pub. No.: WO2015/176760
PCT Pub. Date: Nov. 26, 2015

(65) Prior Publication Data
US 2017/0108888 A1    Apr. 20, 2017

(51) Int. Cl.
*G05F 1/70* (2006.01)
*H02M 5/45* (2006.01)
(Continued)

(52) U.S. Cl.
CPC .............. *G05F 1/70* (2013.01); *H02J 3/1821* (2013.01); *H02J 3/1842* (2013.01);
(Continued)

(58) Field of Classification Search
CPC ....................................................... G05F 1/70
See application file for complete search history.

(56) References Cited

U.S. PATENT DOCUMENTS

| 5,642,275 A | 6/1997 | Peng et al. |
| 8,207,712 B2 | 6/2012 | Hasler |
| (Continued) | | |

FOREIGN PATENT DOCUMENTS

| DE | 102011086545 A1 | 5/2013 |
| WO | 2008086760 A1 | 7/2008 |

OTHER PUBLICATIONS

Marzoughi, A, et al. "A New Control Strategy for Cascaded H-Bridge Multilevel Converter to Operate as a D-Statcom", Environment and Electrical Engineering, 2012.
(Continued)

*Primary Examiner* — Jue Zhang
*Assistant Examiner* — Trinh Q Dang
(74) *Attorney, Agent, or Firm* — Laurence Greenberg; Werner Stemer; Ralph Locher

(57) ABSTRACT

A converter for symmetrical reactive power compensation has phase legs whose associated phases of a three-phase AC voltage network can be connected and are interconnected in an insulated star connection. The first phase leg is devoid of sub modules. The second and third phase legs each has a phase module with series-connected bipolar sub modules. A control device controls phase module currents and determines voltages to be set at each phase module. A decoupling unit calculates correction voltages for each phase module as a function of a first connection voltage between the first and second phase legs, a second connection voltage between the second and third phase legs and a first and/or a second control voltage each derived from target currents and the phase module currents of the second or third phase legs. The voltages to be set are derived from the control voltages and correction voltages.

7 Claims, 3 Drawing Sheets

(51) Int. Cl.
*H02M 5/46* (2006.01)
*H02J 3/18* (2006.01)
H02M 7/483 (2007.01)
H02M 7/49 (2007.01)

(52) U.S. Cl.
CPC ............ *H02J 3/1857* (2013.01); *H02M 5/45* (2013.01); *H02M 5/46* (2013.01); *H02M 7/483* (2013.01); *H02M 7/49* (2013.01); *H02M 2007/4835* (2013.01); *Y02E 40/22* (2013.01); *Y02E 40/26* (2013.01)

(56) References Cited

U.S. PATENT DOCUMENTS

| | | |
|---|---|---|
| 8,390,259 B2 | 3/2013 | Dommaschk et al. |
| 2006/0133120 A1* | 6/2006 | Sato .................... H02M 5/4585 363/37 |
| 2012/0170338 A1 | 7/2012 | Trainer et al. |
| 2013/0249474 A1* | 9/2013 | Feuerstack .............. B60L 11/18 320/107 |
| 2014/0043873 A1* | 2/2014 | Blomberg ............... H02M 1/32 363/53 |

OTHER PUBLICATIONS

Van Der Broeck, Heinz W., et al. "A Comparative Investigation of a Three-Phase Induction Machine Drive With a Component Minimized Voltage-Fed Inverter Under Different Control Options".

* cited by examiner

CONVERTER FOR SYMMETRICAL REACTIVE POWER COMPENSATION, AND A METHOD FOR CONTROLLING SAME

BACKGROUND OF THE INVENTION

Field of the Invention

The invention relates to a converter for symmetrical reactive power compensation and to a feedback control method for such a converter.

Converters of this kind are known from the prior art. By way of example, the document U.S. Pat. No. 8,207,712 B2 shows a converter having three phase paths that are connected to one another in a star point circuit. The three phase paths are connected to their associated phases of a three-phase AC power supply via coupling inductances. Each phase path has a phase module having a series circuit comprising two-pole sub modules, the sub modules being in the form of what are known as full-bridge circuits. Each sub module accordingly comprises two series circuits comprising power semiconductor switching units, each power semiconductor switching unit comprising a power semiconductor that can be switched off and also a diode reverse-connected in parallel therewith. Further, each sub module comprises an energy store in the form of a capacitor. Each sub module can be actuated such that the poles thereof have a voltage drop across them that corresponds either to the voltage of the capacitor, to the voltage of the capacitor but with the reverse polarity, or to a zero voltage, that is to say a voltage having the value zero. Hence, suitable actuation of the sub modules can be used to generate a step-shaped AC voltage on the phase modules of the converter. In this case, the step height corresponds to the capacitor voltage. Further, the known converter comprises a feedback control device for regulating the currents in the phase paths of the converter, so that it is possible for a desired inductive reactive power to be provided in the AC power supply.

The known converter is particularly also suitable for symmetrical reactive power compensation. Symmetrical reactive power compensation compensates for a reactive power that occurs when all phases in the AC power supply are loaded symmetrically (by contrast, with asymmetrical loading, the currents in the phases of the AC power supply have different amplitudes and different phase shift angles in relation to one another).

However, the known converter is technically relatively complex and expensive to manufacture and operate.

BRIEF SUMMARY OF THE INVENTION

It is the object of the invention to propose a converter for symmetrical reactive power compensation that is of simple design and relatively inexpensive.

The invention achieves the object by means of a converter having a first, a second and a third phase path, wherein each of the three phase paths is connectable to an associated phase of a three-phase AC power supply and the three phase paths are connected to one another in an isolated star point circuit, wherein the first phase path is sub module free and the second and third phase paths each comprise a phase module having a series circuit comprising two-pole sub modules, wherein each sub module has an energy store and also at least one power semiconductor and is actuatable such that the poles of the sub module have a positive sub module voltage, a negative sub module voltage or a voltage having the value zero dropped across them, wherein the converter further comprises a feedback control device for regulating phase module currents, wherein the feedback control device can be used to determine voltages that need to be set on each phase module, and the feedback control device comprises a decoupling unit that is set up to compute correction voltages for each phase module on the basis of a first supply voltage between the first and second phase paths, a second supply voltage between the second and third phase paths and also a first and/or a second control voltage, each derived from nominal currents and the phase module currents of the second and third phase paths, respectively, so that the voltages that are to be set are derivable from the control voltages and the correction voltages.

According to the invention, phase modules are provided only in two of the three phase paths. This simplifies the design of the converter, lowering its manufacturing and operating costs. Furthermore, the reduction in the total number of sub modules used allows the complexity for actuating the sub modules to be reduced.

The phase paths of the converter are connected to one another in an isolated star circuit. This means that the phase paths are brought together at a star point that does not have a predetermined potential, for example the ground potential. It particularly follows therefrom that the currents in the three phase paths of the converter are not regulable independently of one another. The decoupling unit is used to compute this dependency as a correction of the control voltage, the correction voltage being dependent on the supply voltages between connection points from the converter to the AC power supply and the control voltages that ensue from regulation of the phase module currents.

Preferably, the sub modules are in the form of full-bridge circuits, the power semiconductor switches of the sub modules being insulated gate bipolar transistors (IGBTs) or metal oxide semiconductor field effect transistors (MOSFETs), for example. In this context, however, sub modules that have a design that is different than a full bridge are also conceivable. In particular, it is possible to use sub modules whose poles can have multiple positive and/or multiple negative voltage values of the sub module voltage set on them by means of suitable actuation, for example a first and a second positive voltage value and/or a first and a second negative voltage value. Examples of such sub modules are described in the article "Novel DC-AC Converter Topology for Multilevel Battery Energy Storage Systems" by M. Gommeringer et al., PCIM Europe 2013. The voltage dropped across the phase module corresponds to the sum of the sub module voltages that are set on the sub modules.

Preferably, the energy stores of the sub modules are storage capacitors, particularly preferably high-power storage capacitors, in order to better meet the high demands of high-voltage application.

According to one advantageous embodiment of the invention, the feedback control device further has a control unit, connected to the decoupling unit, for actuating the sub modules by means of pulse width modulation (PWM). The control method used may be any suitable PWM method or the method known from the document WO 2008/086760 A1. The control unit may be embodied in the form of what are known as module management systems (MMSs), each of the two phase modules having an associated MMS.

According to a further advantageous embodiment of the invention, the phase modules in the second and third phase paths are each connected to the associated phases of the AC power supply via a coupling inductance. The two coupling inductances are preferably essentially the same. By way of example, the third phase path may be connected to the associated phase of the AC power supply without a coupling inductance. In this case, the computation complexity of the decoupling unit can be advantageously reduced. By way of example, the voltages Uconv2, Uconv3 that need to be set for the phase module of the second and third phase paths, respectively, can be computed in the following manner by correcting the relevant control voltages Ustell2, Ustell3:

$$Uconv2=-Ustell2+U21,$$

$$Uconv3=-Ustell3+U32+U21,$$

Where
- U21 is the supply voltage between a connection point for the second phase path to the associated phase of the AC power supply and a connection point for the first phase path to the associated phase of the AC power supply, and
- U32 is the supply voltage between a connection point for the third phase path to the associated phase of the AC power supply and a connection point for the second phase path to the associated phase of the AC power supply.

According to an alternative embodiment of the invention, all three phase paths each have a coupling inductance, these preferably all having the same inductance value. The operation to be formed in the decoupling unit in this case is fittingly:

$$Uconv2=-Ustell3-2*Ustell2+U21,$$

$$Uconv3=-2*Ustell3-Ustell2+U32+U21.$$

It is naturally likewise conceivable to choose other combinations of the coupling inductances in the phase paths with other inductance values. In this case, the computation rules for the decoupling unit for the respective configuration can be derived from the usual equations that the person skilled in the art knows for system voltages and system currents. The phase paths may also be connected to the AC power supply directly, that is to say without the use of connecting transformers.

It may be advantageous if the converter comprises measuring apparatuses such as voltage and/or current transformers for recording the phase module currents and the supply voltages. By way of example, the current transformers may be arranged in one or more of the phase paths. Further, capacitive voltage transformers may also be provided in order to measure the supply voltages.

According to a further advantageous embodiment of the invention, the feedback control device further comprises signal processing units, associated with the phase modules, each having an averager, a subtractor, a voltage regulator, a frequency former and an adder. In this case, for each of the signal processing units, the averager is set up to form an average of the energy store voltages of the associated phase module, the subtractor has its input side connected to an output of the averager and is set up to form a control difference from the average of the energy store voltages and a prescribed DC voltage nominal value, the voltage regulator has its input side connected to an output of the subtractor and is set up to form an active nominal current value from the control difference, the frequency former has its input side connected to an output of the voltage regulator and is set up to form an active nominal current from the active nominal current value as an alternating current having a given phase angle, and the adder has its input side connected to an output of the frequency former and is set up to form the nominal current for the associated phase module from the active nominal current and a prescribed reactive nominal current.

Accordingly, the (AC) nominal current for each phase module is composed of two components: the active and reactive nominal currents. In this case, the absorption of an active power by the converter serves to compensate for an undesirable voltage drop in the energy stores of the sub modules. The voltage regulator may be a suitable linear regulator, for example.

Preferably, the signal processing units are part of a digital data processing installation. If the individual energy stores of the sub modules are in different forms, then the energy store voltages can also be compared with associated different DC voltage nominal values in order to regulate the energy intake. It is likewise conceivable to replace the simple averaging in the averager with computation appropriately matched to the sub modules used, for example weighted averaging. The frequency former takes the constant or temporally slowly changing prescribed DC voltage nominal value and produces an AC variable therefrom whose phase angle is the same as the phase angle of the voltage in the AC power supply. Fittingly, the output of the signal processing units is connected to the respective input of a current regulator of the associated phase module.

A further object of the invention is to provide a feedback control method for a converter as described above that is as simple and reliable as possible.

The object is achieved by a method in which current regulators are used to obtain a first control voltage for the phase module of the second phase path from a prescribed first nominal current and a phase module current measured in the second phase path, and a second control voltage for the phase module of the third phase path from a prescribed second nominal current and a phase module current measured in the third phase path, wherein a voltage that is to be set on the phase module of the second phase path is computed on the basis of the first control voltage and a first correction voltage, and a voltage that is to be set on the phase module of the third phase path is computed on the basis of the second control voltage and a second correction voltage, the first and second correction voltages each being computed on the basis of a first supply voltage between the first and second phase paths, a second supply voltage between the second and third phase paths and also the first and/or the second control voltage. Since the control voltages are augmented by the correction voltages, the currents in the phase paths can be decoupled from one another, which first allows reliable provision of the symmetrical reactive power in the AC power supply.

Preferably, the voltages that are to be set on the phase modules are converted by means of pulse width modulation into control signals for actuating the associated sub modules. In this case, it is preferably possible to use the method known from the document WO 2008/086760 A1, which allows the energy in the energy stores of the sub modules to be kept essentially at the same level.

According to a preferred embodiment of the method, the first and second nominal currents are each composed of an active nominal current and a reactive nominal current, the active nominal currents being determined on the basis of an average of the voltages of the phase modules of the second and third phase paths that are dropped across the sub modules and a prescribed DC voltage nominal value. In this case, the active nominal current has the function of regulating the voltage on the phase modules such that energy losses in the energy stores of the sub modules are equalized by taking appropriate active power from the AC power supply.

The invention is explained in more detail below using the exemplary embodiments represented in FIGS. 1 to 4.

DESCRIPTION OF THE INVENTION

Figure 1:
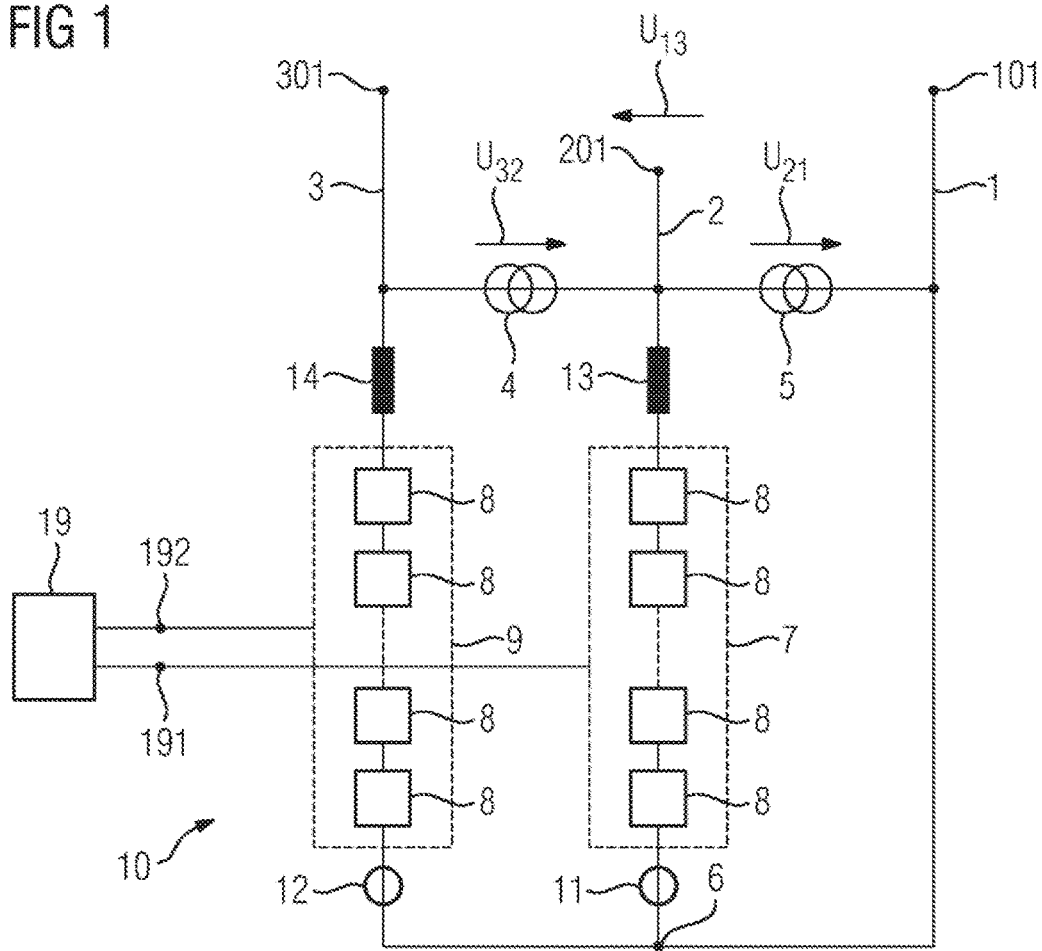
FIG. 1 shows a schematic representation of a first exemplary embodiment of a converter according to the invention.

Specifically, FIG. 1 shows a schematic representation of an exemplary embodiment of a converter 10 according to the invention for symmetrical reactive power compensation. The converter 10 has three phase paths 1, 2, 3. A first phase path 1 is connected via a connection point 101 to a first associated phase of an AC power supply. The AC power supply itself is not graphically represented in FIG. 1. A second phase path 2 is connected via a connection point 201 to an associated second phase of the AC power supply. A phase path 3 is connected via a connection point 301 to a third, associated phase of the AC power supply. The connection points 101, 201, 301 have supply voltages dropped between them, which are represented as arrows in FIG. 1, said arrows being denoted by the references U21, U13 and U32. The voltage U32 and the voltage U21 are measured by means of the voltage transformers 4 and 5, respectively.

The converter 10 is connected to the AC power supply in isolable fashion by means of suitable switches, which are not represented here.

The phase paths 1, 2 and 3 are connected to one another in a star circuit. The star point 6 of the star point circuit is of isolated design. This means that the star point 6 is not at a fixed, defined potential.

The second phase path 2 has a phase module 7 that comprises a series circuit comprising two-pole sub modules 8. The third phase path 3 has a phase module 9 that comprises a series circuit comprising sub modules 8. In the example shown, the series circuits each comprise N sub modules 8, the number of sub modules being geared to the voltages that need to be applied in the phase module. In the exemplary embodiment of the converter 1 from FIG. 1, all the sub modules 8 are of the same design. A current through the phase module 7 is measured by means of an ammeter 11. A current through the phase module 9 is measured by means of a corresponding ammeter 12. The phase module 7 of the second phase path 2 is connected to the associated phase of the AC power supply via a coupling inductance 13. The phase module 9 of the third phase path 3 is connected by means of a coupling inductance 14 to that phase of the AC power supply that is associated with the third phase path 3. In the exemplary embodiment shown in FIG. 1, the phase paths 1, 2, 3 are connected to the AC power supply without a connecting transformer.

The converter 10 further has a feedback control device 19, represented only schematically here, that is set up to use control outputs 191 and control outputs 192 to regulate the phase module currents $i_A$ and $i_B$.

Figure 2:
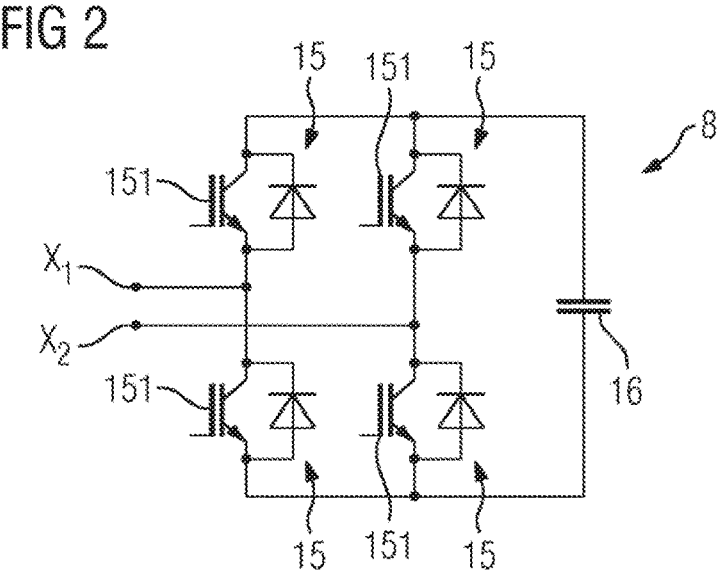
FIG. 2 shows a schematic representation of an exemplary embodiment of a sub module of the converter.

FIG. 2 shows the design of the sub modules 8 in more detail. The sub module 8 is in the form of a two-terminal network, the two terminals of the sub module 8 being denoted by X1 and X2 in FIG. 2. The sub module 8 of FIG. 2 is in the form of what is known as a full-bridge circuit or H-bridge circuit. It has two series circuits comprising power semiconductor switching units 15, which each consist of a parallel circuit comprising a power semiconductor switch that can be switched off and a diode reverse-connected in parallel therewith. Further, the sub module 8 comprises an energy store 16, which is in the form of a storage capacitor in the exemplary embodiment shown in FIG. 2. In this case, the storage capacitor is connected in a parallel circuit with respect to the two series circuits containing the power semiconductor switching units 15. Suitable actuation of the sub modules via the control outputs 191, 192 of the feedback control device 19, which is not shown in FIG. 2, allows each of the sub modules 8 to be actuated such that the two terminals X1 and X2 of the sub modules have a sub module voltage dropped across them that is the same as the voltage dropped across the capacitor 16, the voltage across the capacitor 16 but with the reverse polarity or a voltage having the value zero. As a result, a voltage profile that corresponds to a stepped AC voltage can be produced on each of the phase modules 7, 9 in a temporal sequence.

It should be noted that in the exemplary embodiment of FIGS. 1 and 2, the currents through the second and third phase paths 2 and 3 can be regulated independently of one another, but the current through the first phase path 1 is dependent on the two currents through the phase paths 2 and 3. This needs to be taken into consideration when regulating the converter 10.

Figure 3:
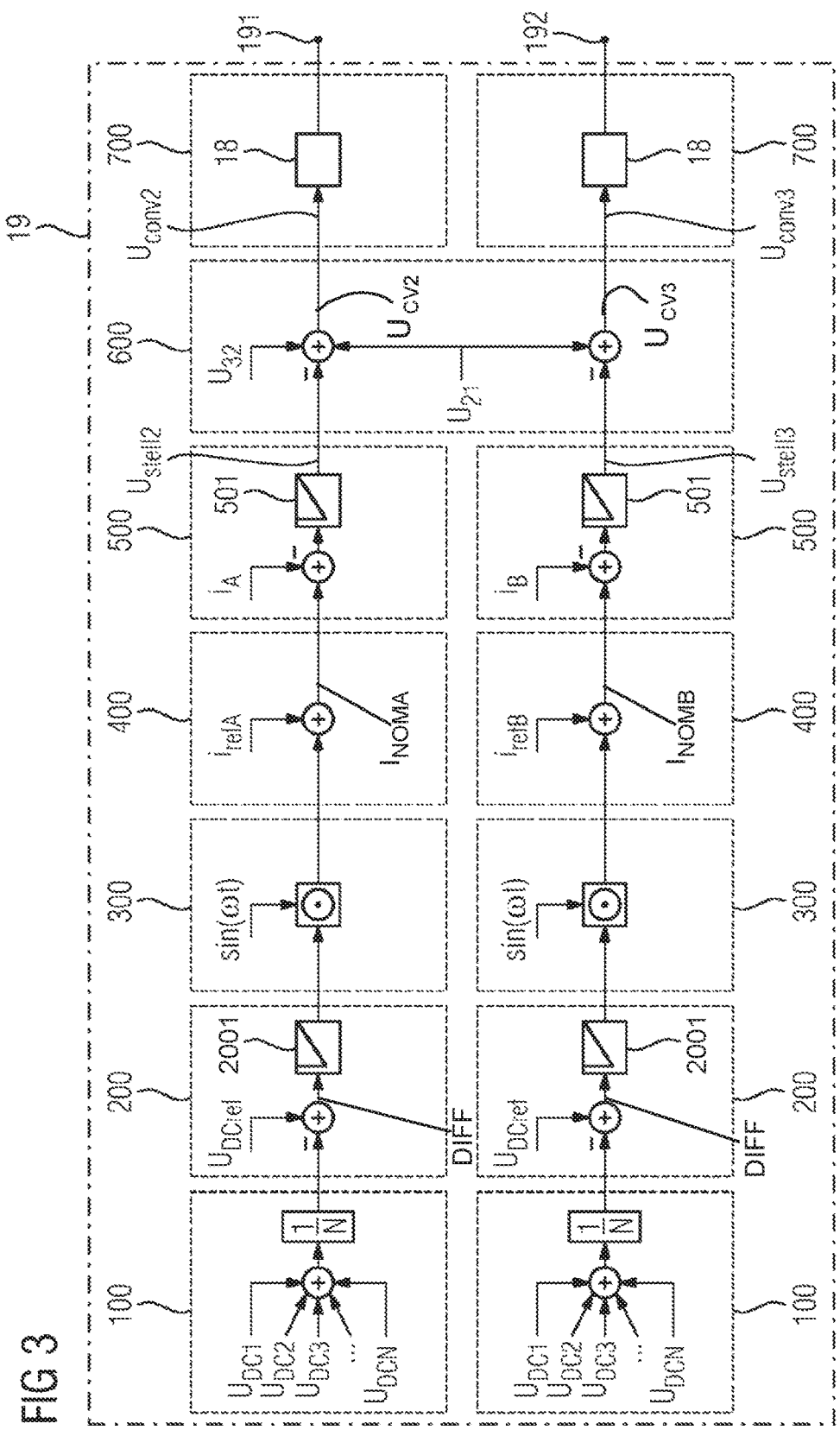
FIG. 3 shows a feedback control device of the converter of FIG. 1 in the form of a block diagram.

FIG. 3 shows the design of an exemplary embodiment of the feedback control device 19 of the converter from the exemplary embodiment of FIGS. 1 and 2 in detail. As an aim to better understanding of the design, the individual components of the feedback control device are broken down in the form of blocks 100 to 700. The feedback control steps being executed in blocks 100 to 500 take place in parallel for the two phase modules of the second and third phase paths. To avoid repetition, these feedback control steps are described in detail below only for the phase module of the second phase path. An averager 100 adds the voltages UDC1 to UDCN of the energy stores 16 of the sub modules 8 of the phase module 7 and forms an average of these voltages. A subtractor 200 compares the difference DIFF between the average of the voltages ascertained in block 100 with a DC voltage nominal value $U_{DCref}$ and passes the result to a voltage regulator 2001, which delivers an active nominal current value at the output of the subtractor 200. A frequency former 300 converts the ascertained active nominal current value into an AC variable by producing the active nominal current from the active nominal current value. The active nominal current is an AC variable whose phase corresponds to the phase of the grid voltage in the AC power supply. An adder 400 is used to add a prescribed reactive nominal current irefA for the phase module 7 to the active nominal current. A unit 500 compares the nominal current $I_{NOMA}$ (The nominal current $I_{NOMB}$ is shown in the other phase path) computed from the active nominal current and the reactive nominal current irefA with a phase module current iA, measured by means of the ammeter 11, to form a current control error and passes the result to a current regulator 501, which computes, at its output, a control voltage Ustell2 for the phase module 7.

An appropriate arrangement of blocks 100, 200, 300, 400 and 500 is provided in relation to the phase module 9, the prescribed reactive nominal current irefB being generally different than the reactive nominal current irefA. A decoupling unit 600 now determines correction voltages $U_{cv2}$, $U_{cv3}$ for the control voltages Ustell2, Ustell3. For the phase module 7, this involves the voltage U21 and the voltage U32 being added to the control voltage Ustell2 in block 600. The voltage Uconv2 to be set on the phase module 7 that is computed in this manner is forwarded to a module management unit (MMS) 18 in block 700, which module management unit accordingly provides, at its outputs 191 forming the outputs of the feedback control device 19, this voltage that is to be set in control signals for the individual sub modules 8 of the phase module 7.

For the third phase module 9, the decoupling unit 600 computes the correction voltage $U_{cv3}$ by adding the voltage U21 to the control voltage Ustell3. The sum of the control voltage Ustell3 and the voltage U21 is forwarded to a module management unit 18 for the phase module 9 by the decoupling unit 600. The module management unit 18 for the phase module 9 converts the voltage Uconv3 that is to be set into control signals for the sub modules 8 of the phase module 9 and provides them at the output 192.

Figure 4:
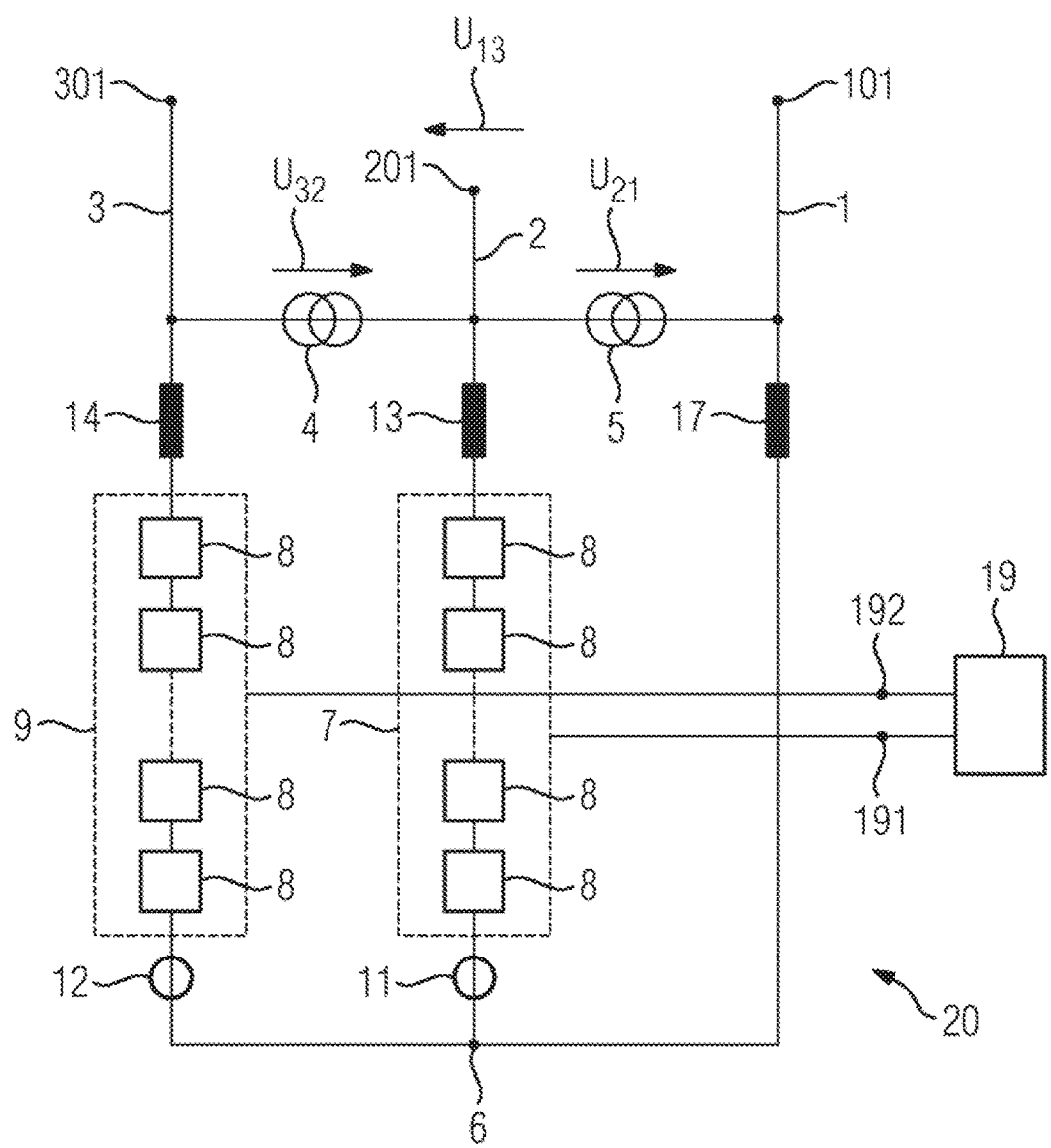
FIG. 4 shows a schematic representation of a second exemplary embodiment of the converter according to the invention.

FIG. 4 represents a second exemplary embodiment of a converter 20 according to the invention. In FIGS. 1 and 4, parts that are the same or are of the same type are provided with the same reference symbols. To avoid repetition, the description of FIG. 4 discusses only the differences between the embodiments of FIGS. 1 and 4. The sub modules 8 of the converter 20 are also of the same design and correspond to the sub modules 8 of FIG. 2.

In contrast to the converter 10 of the exemplary embodiment of FIG. 1, the converter 20 in the exemplary embodiment of FIG. 4 has a coupling inductance 17 in the first phase path 1. The coupling inductance 17 has the same inductive properties as the coupling inductances 14 and 13. In accordance with this difference, the feedback control device 19 or the feedback control method needs to be adapted to the converter 20. Blocks 100, 200, 300, 400, 500 and 700 of the feedback control device of FIG. 3 are unchanged. In the decoupling unit 600 for the converter 20, however, the correction voltage for the respective control voltage Ustell2 or Ustell3 for the phase module 7 or 9, respectively, needs to be computed differently than for the converter 10 of the exemplary embodiment of FIG. 1. The corresponding formulae are reproduced below:

Ustell2 is corrected to 2*Ustell2+Ustell3−U21;    1

Ustell3 is corrected to 2*Ustell3+Ustell2−U32−U21.    2

LIST OF REFERENCE SYMBOLS 1, 2, 3 Phase path
101, 201, 301 Connection point
10 Converter
4, 5 Voltage transformer
6 Star point
7, 9 Phase module
8 Sub module
11, 12 Ammeter
13, 14, 17 Coupling inductance
15 Power semiconductor switching unit
16 Energy store
18 Module management system
151 Power semiconductor
19 Feedback control device
191, 192 Control output
100 Averager
200 Subtractor
300 Frequency former
400 Adder
501 Current regulator
600 Decoupling unit
700 Module management unit
U13, U21, U32 Supply voltages
X1, X2 Terminal of the sub module
UDC1 . . . UDCN Energy store voltage
UDCREF DC voltage nominal value
Ustell2 Control voltage
Ustell3 Control voltage
Uconv2 Voltage to be set
Uconv3 Voltage to be set
irefA, irefB Reactive nominal current
iA, iB Phase module current

The invention claimed is:

1. A converter for symmetrical reactive power compensation, the converter comprising:
three phase paths including a first phase path, a second phase path and a third phase path, each connectable to an associated phase of a three-phase AC power supply, said three phase paths being connected to one another in an isolated star point circuit;
said first phase path being a sub module-free phase path and said second and third phase paths each including a phase module with a series circuit of two-pole sub modules;
each said sub module having an energy storage device and at least one power semiconductor and being actuatable such that the poles of said sub module have at least one positive sub module voltage, at least one negative sub module voltage or a voltage with a value zero dropping across them;
a feedback control device for regulating phase module currents, said control device being configured to determine voltages to be set on each said phase module, and said control device including a decoupling unit configured to compute correction voltages for each said phase module in dependence on:
a first supply voltage between the first and second phase paths;
a second supply voltage between the second and third phase paths; and
control voltages, each derived from a nominal current and a phase module current of said second and third phase paths, respectively;
so that the voltages to be set are derivable from the control voltages and the correction voltages;
said control device further including an averager, a subtractor, a frequency former and an adder;
said averager configured to form an average of energy store voltages of an associated phase module;
said subtractor having an input connected to an output of said averager and is configured to form a difference from the average of the energy store voltages and a DC voltage nominal value;
said frequency former having an input connected to an output of said subtractor; and
said adder having an input connected to an output of said frequency former.

2. The converter according to claim 1, wherein said sub modules are full-bridge circuits and the sub module voltage corresponds to an energy storage device voltage of said energy storage device.

3. The converter according to claim 1, wherein said energy storage devices are storage capacitors.

4. The converter according to claim 1, wherein said control device further comprises a control unit, connected to said decoupling unit, for actuating said sub modules.

5. The converter according to claim 1, wherein each of said phase modules in said second and third phase paths is connected to an associated phase of the AC power supply via a coupling inductance.

6. The converter according to claim 1, wherein said first phase path comprises a coupling inductance.

7. The converter according to claim 1, wherein said converter further comprises ammeters for measuring the phase module currents and voltage transformers for measuring the supply voltages.

* * * * *